Patented Nov. 8, 1949

2,487,336

UNITED STATES PATENT OFFICE 2,487,336

PENICILLIN PRODUCT

William E. Hinds, Hillsboro, Oreg.

No Drawing. Application February 25, 1946,
Serial No. 650,109

2 Claims. (Cl. 167—65)

1

The present invention broadly relates to a penicillin product comprising penicillin and a carrier therefor and to the method of preparing the same.

It is particularly concerned with a penicillin product especially adapted for oral administration.

An object of the present invention is to provide a penicillin product containing a stable, nontoxic, protective carrier for the penicillin. Another object of the invention is to provide a penicillin product which can be administered either orally or hypodermically. A further object of the invention is to provide a penicillin product for oral administration including a carrier which will effectively protect the penicillin from the destructive and inactivating action of the stomach fluids and facilitate the transmission of the penicillin over to the small intestine where it can be more readily picked up by the blood and assimilated into the system. Another object of the invention is to provide a penicillin product which when administered by the hypodermic method is readily absorbed into the blood stream without undue damage to the tissues.

The above and further objects of the invention which will become apparent from the following description are attained in accordance with the present invention by combining the penicillin with a protective carrier comprising a liquid wax. One such substance, which I have found particularly efficient for the stated purposes, is the liquid vegetable wax known as jojoba oil obtained from the seed or nut of the jojoba shrub or tree. Although called an oil, this substance is from the chemical standpoint more properly termed a liquid wax and unless otherwise limited the term "jojoba wax" will be used hereinafter and in the appended claims as designating this oily liquid as well as the products obtained by hydrogenization of the liquid wax. Other substances which may be properly regarded as equivalents of the jojoba wax are, of course, also included within the scope of the present invention, including both synthetic or natural liquid waxes.

One method of preparing the products of the present invention comprises mechanically mixing a predetermined amount of any of the dry forms of penicillin such as the commonly used salts of penicillin and an alkali or alkaline earth metal such as sodium, calcium, barium, etc., with a small amount of the liquid jojoba seed wax so that the penicillin is broken up into minute particles. During the mixing operation the particles of penicillin become coated with the liquid wax and remain so coated. The liquid jojoba wax employed in the preparation of the subject products is preferably the bleached, refined material which has been heat sterilized and thereafter passed through a bacteriological filter.

I have found that an unusually large amount of penicillin can be protected and rendered stable by coating the penicillin particles with a liquid wax such as jojoba wax. For example, mixtures of penicillin and jojoba wax have been stored at ice box temperatures for a period of eleven months and have shown a loss of only eight percent activity at the end of this period, this difference in activity coming within analytical error. Storage at room temperature showed no detectable loss of penicillin activity at the end of four months.

For maximum stability it is desirable that both the penicillin and the jojoba wax be free of moisture at the time they are mixed. However, once the combination has been achieved, the stability of the penicillin activity is certain even when the resultant products are stored in ordinary stoppered bottles at room temperatures.

Although there is some small loss of penicillin in the stomach when the products of the present invention are administered orally, the degree of protection offered by the jojoba wax against the action of the stomach fluids is sufficient to carry most of the penicillin through to the intestine. For example, by an oral dosage of not more than three to four times the normal amount of penicillin used in intermuscular injection, a substantially equivalent result can be obtained. This has been demonstrated by taking blood and urine samples after each type of administration and ascertaining from them the amount of penicillin assimilated in the blood stream and the amount thrown off by the body, as well as by clinical results.

As has been previously indicated the products of the present invention are also adapted for administration hypodermically for systemic treatment and it is believed that in this method, a liquid wax such as liquid jojoba wax is superior to other known carriers in that both the wax and its principal hydrolysis or decomposition products are liquid at body temperatures. The liquid jojoba wax is essentially composed of the esters of eicosenoic and docosenoic (erucic) acids with eicosenyl and docosenyl alcohols while the hydrogenated wax which ordinarily is a solid at room temperature is principally composed of the hydrogenated esters. The liquid wax ordinarily contains only a fraction of a percent of the usual fatty acids such as palmitic and oleic acids which are present in substantial proportions in vegetable oils. This fact and the fact that the jojoba wax is stable and contains no glycerine or glycerides is probably responsible, at least in part, for the stability of the preparations of the present invention.

For hypodermic uses the wax component will ordinarily be in the form of the liquid material although, if desired, up to about five percent of the wax component may be the hydrogenated jojoba wax, beeswax or the like. However for oral administration either the liquid wax or mixtures thereof containing substantial quantities, for example 50 percent of the solid hydrogenated product can be employed. In some cases it may be found desirable to employ mixtures of the jojoba wax, for example, the liquid wax or mixtures thereof with the hydrogenated wax and a minor proportion, about five percent, of some other solid wax such as beeswax. The oral dosages can be given in gelatin capsules, the capsules acting as an additional protection of the penicillin. The consistency or viscosity of the mixtures can be varied either by addition of more or less of the liquid jojoba seed wax or by incorporating greater or lesser amounts of hydrogenated wax, beeswax or the like. Compositions containing substantial quantities of the low viscosity liquid jojoba wax have been found to vary insignificantly in consistency under different temperature conditions above about 10° C. As the jojoba wax does not readily absorb oxygen and is much more stable than other commonly used medicinal carriers, it is ideally suited as both a carrier and protective agent for the penicillin particles.

While the invention has been particularly described with regard to jojoba wax or its equivalent as an essential component of penicillin preparations for oral or hypodermic administration, it should be noted that many of the advantages above mentioned apply to other types of penicillin products such as salves, ointments, suppositories, lozenges, cold creams and oils in many of which the jojoba wax may be substituted for all or part of the vegetable oils or the like ordinarily used in compounding many of these preparations.

Experiments with other commonly employed carriers and protective agents have shown that both the liquid and solid hydrogenated jojoba wax as well as combinations thereof with minor proportions of other waxes, such as beeswax, are superior for the purposes of the present invention. These experiments have included the use of various vegetable oils, sperm oil, and combinations of vegetable oils with beeswax as carriers for the penicillin. In no case were the results as satisfactory as with the above mentioned jojoba wax combinations. In the oral administration of the vegetable oil products substantial quantities of the penicillin were lost or inactivated in the stomach before the products reached the intestine. Sperm oil compositions were superior to the vegetable oil products but did not compare with those containing jojoba wax. All of the vegetable oil combinations were unsatisfactory from the storage standpoint due to the ease with which such oils disintegrate and become rancid in the presence of oxygen or moisture or both. The jojoba wax on the other hand will not become rancid and also effectively protects the penicillin particles from moisture, oxidation or any other source of disintegration prior to administration. After oral or hypodermic administration it is more efficient and effective, for the reasons given hereinbefore, than other known products of like nature.

From the above description of the naturally occurring jojoba wax and a comparison of its major and characterizing components with the composition of the vegetable oils it is apparent that other synthetic or natural liquids, which by analogy with the jojoba wax can be called liquid waxes may be substituted for the liquid jojoba wax to obtain many of the advantages of the jojoba wax. Such substances include for example, synthetically prepared esters of eicosenoic acid and eicosenyl alcohol, docosenoic acid and docosenyl alcohol as well as the liquid esters of other higher unsaturated straight chain acids and unsaturated straight chain alcohols containing at least ten, preferably upward of about fourteen carbon atoms in both the alcohol and acid radicals. In general, best results are obtained with esters of alcohols and acids containing eighteen or more carbon atoms. Such liquids, of which oleyl oleate, is also an example, have many of the desirable characteristics of the liquid jojoba wax including the stability and freedom from any susbtantial tendency to become rancid, which properties are not characteristic of the glyceride-containing vegetable oils. They may be used either alone or in the form of mixtures with one another or with the liquid or hydrogenated jojoba wax to form stable, nontoxic protective carriers for penicillin.

Having described the invention in what are considered to be certain preferred embodiments thereof it is desired that it be understood that the specific details given are merely illustrative and that the invention may be carried out by other means.

What I claim is:

1. A penicillin preparation comprising penicillin particles coated with jojoba wax.
2. A penicillin preparation comprising an intermixture of penicillin particles and jojoba wax.

WILLIAM E. HINDS.

REFERENCES CITED

The following references are of record in the file of this patent:

Botanical Gazette, June 1933, pages 826 to 828. (Copy in Division 64.)
Science, July 20, 1945, pages 66 and 67.
Science, Nov. 3, 1944, pages 412 and 413.
Science, Sept. 1, 1944, pages 196 to 198.
Science, Feb. 16, 1945, pages 178 to 180.
Science, Mar. 2, 1945, pages 228 to 229.
Proc. Soc. Exptl. Biol. and Med., June 1942, page 287.